United States Patent
Li et al.

(10) Patent No.: US 11,833,808 B2
(45) Date of Patent: Dec. 5, 2023

(54) AIR PURGING

(71) Applicant: Hewlett-Packard Development Company, L.P., Spring, TX (US)

(72) Inventors: Wenbing Li, Singapore (SG); Craig L Malik, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 579 days.

(21) Appl. No.: 17/049,116

(22) PCT Filed: May 3, 2018

(86) PCT No.: PCT/US2018/030955
§ 371 (c)(1),
(2) Date: Oct. 20, 2020

(87) PCT Pub. No.: WO2019/212558
PCT Pub. Date: Nov. 7, 2019

(65) Prior Publication Data
US 2021/0237465 A1   Aug. 5, 2021

(51) Int. Cl.
*B41J 2/19* (2006.01)
*B33Y 40/00* (2020.01)
*B29C 64/321* (2017.01)

(52) U.S. Cl.
CPC .............. *B41J 2/19* (2013.01); *B29C 64/321* (2017.08); *B33Y 40/00* (2014.12)

(58) Field of Classification Search
CPC .. B41J 2/1707; B41J 2/17523; B41J 2/17506; B41J 2/17509
See application file for complete search history.

(56) References Cited

U.S. PATENT DOCUMENTS

| | | |
|---|---|---|
| 4,831,389 A | 5/1989 | Chan |
| 5,886,718 A | 3/1999 | Johnson |
| 5,912,688 A | 6/1999 | Gragg |
| 6,139,138 A | 10/2000 | Powers et al. |
| 6,264,318 B1 | 7/2001 | Oda |
| 6,652,080 B2 | 11/2003 | Childs |
| 2006/0001715 A1 | 1/2006 | Umeda et al. |
| 2006/0007279 A1 | 1/2006 | Holland |
| 2006/0114298 A1 | 6/2006 | Anderson, Jr. et al. |
| 2007/0120912 A1 | 5/2007 | Lim et al. |
| 2010/0123765 A1 | 5/2010 | Takata |
| 2010/0231668 A1 | 9/2010 | Ito |
| 2010/0283822 A1 | 11/2010 | Arnold et al. |
| 2011/0109707 A1 | 5/2011 | Murray |

FOREIGN PATENT DOCUMENTS

| | | |
|---|---|---|
| CN | 1260750 A | 7/2000 |
| CN | 1351542 | 5/2002 |
| CN | 1747838 | 3/2006 |
| CN | 1927590 A | 3/2007 |
| CN | 101157305 | 4/2008 |
| CN | 101314285 | 12/2008 |
| CN | 102596577 | 7/2012 |
| EP | 1908596 | 4/2008 |
| JP | 2004209896 | 7/2004 |
| WO | WO-20090096965 | 8/2009 |

*Primary Examiner* — Julian D Huffman
(74) *Attorney, Agent, or Firm* — Brooks, Cameron & Huebsch, PLLC (57) ABSTRACT

Examples of air purging from a fluid delivery tube of an imaging device are described. In an example, air is removed from the fluid delivery tube by an air purging unit prior to coupling a cartridge in the imaging device.

15 Claims, 7 Drawing Sheets

AIR PURGING

BACKGROUND

Imaging devices, such as printers, photocopiers, and plotters, may be used to print on a variety of media, including papers, films, and fabrics. And in some cases, imagine devices may be capable of forming three-dimensional (3D) objects, such as using build material. In order to enable printing, an imaging device may include a cartridge having a printing fluid reservoir. The printing fluid reservoir may hold a printing fluid, such as an ink for printing markings, for example text and images, onto a medium, or may hold an agent for solidification of a build material for forming a 3D object. In some cases, the cartridge may be integrated with a printhead having nozzles to dispense the printing fluid from the printing fluid reservoir. In some other cases, a printhead having nozzles to dispense the printing fluid may be external to the cartridge, and together, the cartridge and the printhead may enable dispensing of the printing fluid onto a medium to print markings, or onto a surface having a build material to form a 3D object.

BRIEF DESCRIPTION OF DRAWINGS

The following detailed description references the drawings, wherein.

DETAILED DESCRIPTION

Off-axis or carriage-based imaging devices include a movable housing which may move over a medium for printing on the medium or dispensing an agent for forming a three-dimensional (3D) object. The movable housing may have a plurality of cartridges installed thereon. Each of the plurality of cartridges may be integrated with a printhead, or may be coupled to a printhead, through which a printing fluid, such as an ink or an agent, is dispensed. An off-axis imaging device has a plurality of fluid storage chambers placed remotely from the housing. Each of the plurality of fluid storage chambers is coupled to the housing through a respective fluid delivery tube to supply printing fluid to one of the cartridges installed in the housing. The housing has a plurality of inlets to deliver the printing fluid to the plurality of cartridges. One cartridge and one fluid delivery tube are respectively coupled to one inlet from opposite side of the inlet. The cartridge receives the printing fluid from the fluid storage chamber through the fluid delivery tube and the inlet.

The off-axis imaging devices are generally shipped with empty fluid storage chambers and cartridges uninstalled. At the time of setting up the imaging device, a printing fluid is filled in the fluid storage chambers and cartridges are installed in the housing. At the startup of the imaging device, before the printing fluid could flow to a cartridge, air in the fluid delivery tube is received by the cartridge and thus the printhead. Air going into the cartridge and the printhead may adversely affect the working and life of the printhead.

The present subject matter describes an air purging unit that can be coupled to a housing of an off-axis imaging device prior to installation of cartridges in the housing. The air purging unit of the present subject matter purges air from fluid delivery tubes after printing fluid is filled in fluid storage chambers, but prior to installation of cartridges. Thus, cartridges, when installed in the housing of the imaging device, receive the printing fluid from the fluid storage chambers without receiving any air from the fluid delivery tubes, which facilitates in improving the working and life of the printhead.

In accordance with an example, the air purging unit includes a barrel and a fluid-flow channel. One end of the fluid-flow channel is connected to the barrel, and another end of the fluid-flow channel can be removably coupled to an inlet of a housing of the imaging device. The inlet of the housing is couplable to a fluid delivery tube from a fluid storage chamber to deliver the printing fluid to a cartridge that may be coupled to the inlet. In an example implementation, the air purging unit may include a plurality of fluid-flow channels connected to the barrel. The plurality of fluid-flow channels corresponds to multiple inlets in the housing that are provided for connecting a plurality of cartridges. The air purging unit includes a piston element which forms an air-tight seal inside the barrel. The air purging unit also includes a spring element connected, in a biased state, between an inner surface of the barrel and the piston element. The air purging unit further includes a locking unit that locks the piston element and retains the spring element in the biased state.

In an example implementation, the imaging device may be shipped with the air purging unit fitted therein, and with no cartridge installed in the housing, and no printing fluid in the fluid storage chambers of the imaging device. The air purging unit is coupled to, or positioned inside, the imaging device by coupling the fluid-flow channel of the air purging unit to the inlet of the housing, in place of a cartridge. At the time of initial setup of the imaging device, a printing fluid may be filled in the fluid storage chamber of the imaging device. Upon filling the printing fluid in the fluid storage chamber, the air purging unit may be operated to purge air from the fluid delivery tube connecting the fluid storage chamber to the inlet in the housing. For operating the air purging unit, the locking unit is unlocked which releases the piston element, breaks the air-tight seal between the piston element and the barrel, and unbiases the spring element. As a result, air is removed from the fluid delivery tube through the inlet. Once air is removed from the fluid delivery tube, the air purging unit may be removed from the imaging device, and the cartridge may be coupled to the inlet.

The air purging unit of the present subject matter, when coupled to an imaging device, enables purging of air from fluid delivery tubes that couple fluid storage chambers to the housing of the imaging device. The air purging unit of the present subject matter allows purging of air from fluid delivery tubes prior to coupling cartridges to the inlets in the housing, which facilitates in improving the working and life of the printhead.

The following description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
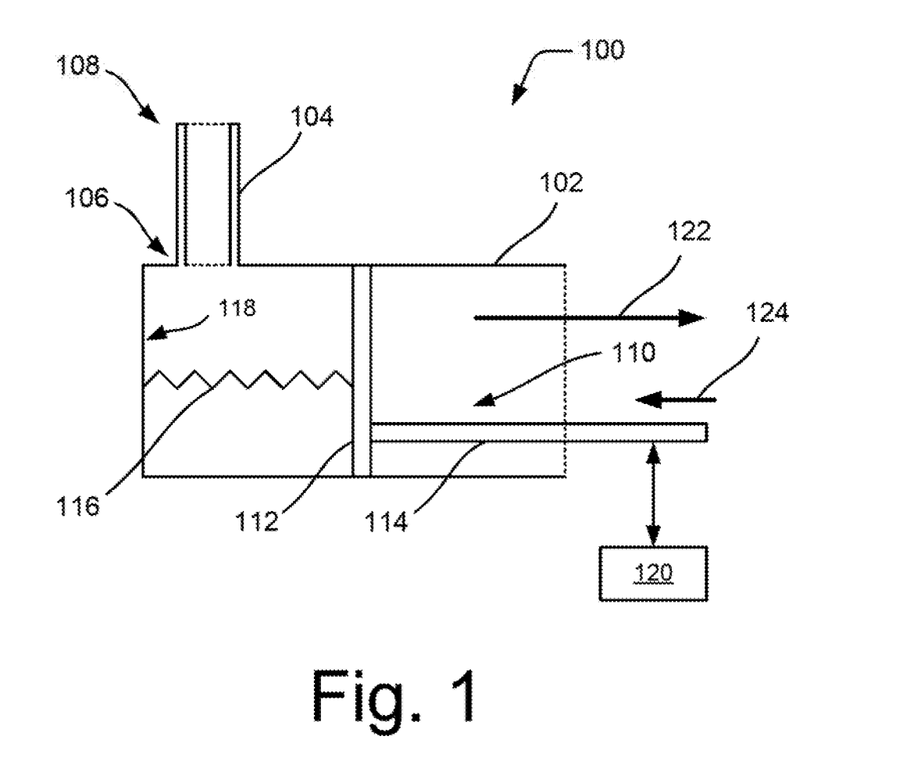
FIG. 1 illustrates a schematic view of an air purging unit, according to an example.

FIG. 1 illustrates a schematic view of an air purging unit 100, according to an example. The air purging unit 100 includes a barrel 102 and a fluid-flow channel 104. A first end 106 of the fluid-flow channel 104 is connected to the barrel 102. The fluid-flow channel 104 is connected to the barrel 102 such that a continuous passage is formed from the fluid-flow channel 104 into the barrel 102. A second end 108 of the fluid-flow channel 104 is removably couplable to an inlet of a housing of an imaging device (not shown in FIG. 1) to purge air from a fluid delivery tube that connects a fluid storage chamber to the inlet of the housing. The inlet of the housing is a port that supplies a printing fluid to a cartridge that may be connected to the inlet. The barrel 102 may be a cylindrical chamber, or a chamber of any other shape, closed from one side and open from the opposite side. The fluid-flow channel 104 may be a hollow cylindrical column, or a hollow column of any other shape. The barrel 102 and the fluid-flow channel 104 may be made of a plastic material, a polymer, or a metal, or a combination thereof.

Further, as shown in FIG. 1, the air purging unit 100 includes a piston element 110 forming an air-tight seal inside the barrel 102. The piston element 110 has a plate-like element 112 and a rod 114 connected to the plate-like element 112. The piston element 110 may be made of a plastic material or a metal, or a combination thereof. The plate-like element 112 may have a sealing element (not shown) that provides the air-tight seal between the piston element 110 and the barrel 102. The sealing element may be an annular elastic seal wrapped around the plate-like element 112.

Further, the air purging unit 100 includes a spring element 116 connected between an inner surface 118 of the barrel 102 and the piston element 110. The spring element 116 is in a biased state. In an example, the spring element 116 in the biased state may be compressed, such that release of the spring element 116 exerts a force, in the direction of release, on the piston element 110. In an example, the spring element 116 may be a coil spring.

Further, the air purging unit 100 includes a locking unit 120 to lock the piston element 110 and retain the spring element 116 in the biased state. In an example implementation, the locking unit 120 may be a mechanical lock or an electromechanical lock. The locking unit 120 is unlockable to release the piston element 110, break the air-tight seal between the piston element 110 and the barrel 102, and unbias the spring element 116. The release of the piston element 110 and unbiasing of the spring element 116 causes the spring element 116 to break the air-tight seal and push the piston element 110 outward from the barrel 102 in a direction indicated by an arrow 122. This movement of the piston element 110 results in a suction action which pulls air from the fluid-flow channel 104 towards the barrel 102. When the fluid-flow channel 104 is coupled to the inlet of the housing, which is coupled to a fluid delivery tube from a fluid storage chamber of the imaging device, the suction action of the piston element 110 pulls air from the fluid delivery tube through the inlet into the barrel 102.

In an example implementation, the locking unit 120 moves the piston element 110 prior to breaking the air-tight seal. The locking unit 120 may move the piston element 110 in a direction (indicated by the arrow 124) to release the piston element 110 and depress the spring element 116. Once the piston element 110 is released, the spring element 116 unbiases to push the piston element 110 in the direction (indicated by the arrow 122) to break of the air-tight seal inside the barrel 102, thereby purging of air by the air purging unit 100.

Although the air purging unit 100 is shown to have one fluid-flow channel 104, in an example implementation, the air purging unit may include a plurality of fluid-flow channels connected to the barrel. The number of fluid-flow channels in the air purging unit may be equal to the number of inlets for cartridges that are in the housing of the imaging device to which the air purging unit is coupled.

Figure 2:
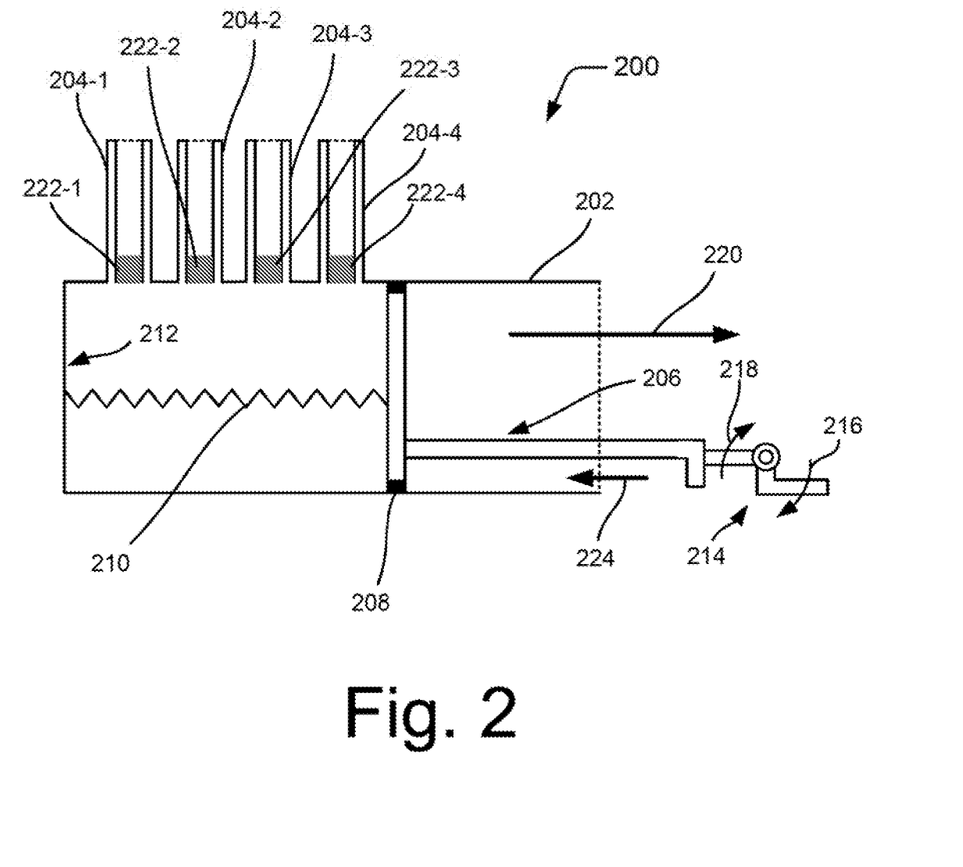
FIG. 2 illustrates a schematic view of an air purging unit, according to another example.

FIG. 2 illustrates a schematic view of an air purging unit 200, according to another example. The air purging unit 200 includes a barrel 202 similar to the barrel 102, and includes four fluid-flow channels 204-1, 204-2, 204-3, and 204-4 (collectively referred to as 204). Each of the four fluid-flow channels 204 from one end is connected to the barrel 202 to form a respective continuous passage from the fluid-flow channel into the barrel 202. The four fluid-flow channels 204 through their respective other ends are removably couplable to four inlets of a housing of an imaging device (not shown in FIG. 2). The four inlets in the housing may be ports that supply cyan, magenta, yellow, and black inks, respectively, to cartridges that may be connected to the inlets. Each of the fluid-flow channels 204 may be a hollow cylindrical column, or a hollow column of any other shape, similar to the fluid-flow channel 104 of the air purging unit 100.

Further, the air purging unit 200 includes a piston element 206 similar to the piston element 110 of the air purging unit 100. The piston element 206 forms an air-tight seal inside the barrel 202. The piston element 206 has a sealing element 208 that provides the air-tight seal between the piston element 206 and the barrel 202. The air purging unit 200 also includes a spring element 210 connected between an inner surface 212 of the barrel 202 and the piston element 206. The spring element 210 is in a biased state, for example, in a compressed state, such that release of the spring element 210 exerts a force, in the direction of release, on the piston element 206. In an example, the spring element 210 may be a coil spring.

Further, the air purging unit 200 includes a mechanical locking unit 214, as shown in FIG. 2. In an example implementation, the air purging unit 200 may include an electromechanical lock instead of a mechanical lock. The locking unit 214 is pivotally held against a housing or any component of the air purging unit 200. The locking unit 214 locks the piston element 206 and retains the spring element 210 in the biased state. To unlock the locking unit 214, the locking unit 214 may be moved in directions indicated by arrows 216 and 218. Such a movement of the locking unit 214 moves the piston element 206 in a direction indicated by an arrow 224 to release the piston element 206 and depress the spring element 210. The release of the piston element 206 unbiases the spring element 210 which causes the spring element 210 to push the piston element 206 in a direction referenced by an arrow 220 and break the air-tight seal. This movement of the piston element 206 in the direction indicated by the arrow 220 results in a suction action which pulls air from the fluid-flow channels 204 towards the barrel 202.

It may be noted that the barrel 202, all the four fluid-flow channels 204 coupled to the inlets of the housing of the imaging device, and the fluid delivery tubes connected to the inlets operate as a single volume. The barrel 202 is of a volume equal to or more than the total volume of the fluid delivery tubes and the fluid-flow channels 204 to ensure purging of air from all the fluid delivery tubes.

Further, in an example implementation, the air purging unit 200 include a self-sealing porous plug 222-1, 222-2, 222-3, and 222-4 in each of the fluid-flow channels 204. The self-sealing porous plug in a respective fluid-flow channel is placed such that it interfaces with the inlet coupled to the respective fluid-flow channel. The self-sealing porous plug 222-1, 222-2, 222-3, and 222-4 allows air to pass through and self-seal in response to receiving any fluid, such as ink, from the inlet. In an example implementation, the self-sealing porous plug 222-1, 222-2, 222-3, and 222-4 includes an additive, such as a gel, which upon being wetted by a fluid may expand to seal the plug and the fluid-flow channel.

It may be noted that the fluid delivery tubes in the imaging device may have different lengths and diameters, and printing fluids delivered to the fluid delivery tubes may have different viscosities. Thus, air may purge out from the fluid delivery tubes at different rates, i.e., air from some fluid delivery tubes may purge out at a faster rate in comparison to that from others. While the air is purging from a fluid delivery tube, the printing fluid is drawn from the corresponding fluid storage chamber into the fluid delivery tube. A fluid delivery tube from which air is purged at a faster rate releases printing fluid into the inlet earlier. Printing fluid received in the inlet wets and seals the self-sealing porous plug and no more air is purged through the fluid-flow channel with the sealed porous plug. The remaining of the suction action of the piston element in the barrel purges air from the fluid delivery tubes through the fluid-flow channels having unsealed porous plugs. The self-sealing porous plugs in the fluid-flow channels ensure purging of air from all the fluid delivery tubes. The self-sealing porous plugs also limit printing fluid accumulation in the barrel which facilitates in reducing wastage of printing fluid.

Figure 3:
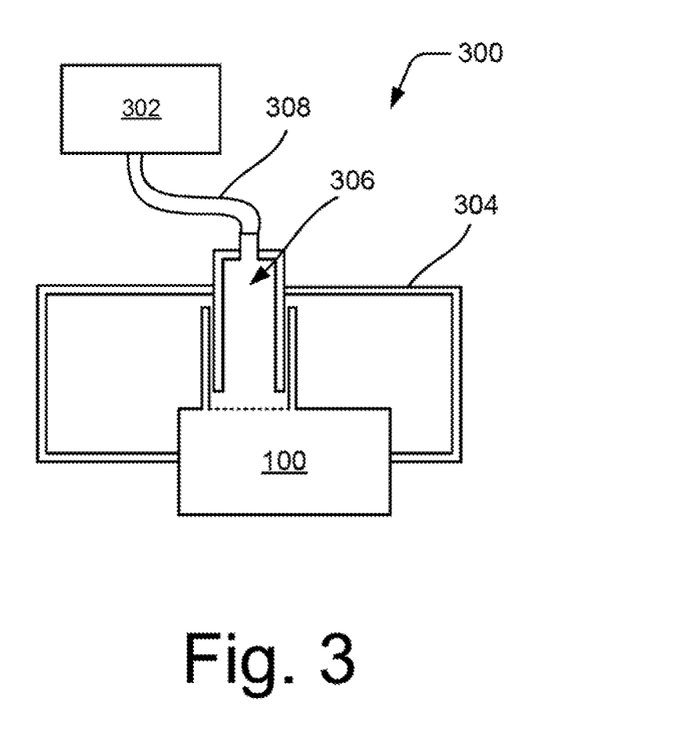
FIG. 3 illustrates a schematic view of an imaging device with an air purging unit, according to an example.

FIG. 3 illustrates a schematic view of an imaging device 300 with the air purging unit 100, according to an example. The imaging device 300 may be a printer, a photocopier, a plotter, or the like. The imaging device 300, apart from other components, includes a fluid storage chamber 302, a housing 304 with an inlet 306, and a fluid delivery tube 308 fluidically coupling the fluid storage chamber 302 to the inlet 306. The fluid storage chamber 302 may store a printing fluid, such as ink, and supplies the ink for printing on media, such as papers, films, fabrics, and such. The fluid storage chamber 302 may store a printing fluid, such as a binding agent, and supplies the binding agent for forming a 3D object. The inlet 306 is to receive the printing fluid from the fluid storage chamber 302 through the fluid delivery tube 308 and deliver the printing fluid to a cartridge (not shown in FIG. 3) couplable to the inlet 306. The housing 304 may move over a medium for the purpose of printing markings, such as text, images, etc., on the medium, or may move over a surface having a build material for the purpose of solidifying the build material for forming a 3D object. The other components (not shown) of the imaging device 300 may include, but are not limited to, a media source, an input/output interface, an output tray, and other electronic and electrical components.

The imaging device 300, as shown, includes the air purging unit 100 detachably coupled to the inlet 306 of the housing 304. As described earlier, the fluid-flow channel 104 (not shown in FIG. 3) of the air purging unit 100 is coupled to the inlet 306. In an example, the imaging device 300 may be shipped with the air purging unit 100 coupled to the housing 304 so as to remove air from the fluid delivery tube 308 prior to coupling a cartridge to the inlet 306. The components and the operation of the components of the air purging unit 100 for purging of air from the fluid delivery tube 308 the same as described earlier with respect to the description of FIG. 1. Once air is removed from the fluid delivery tube 308, the air purging unit 100 is removed from the imaging device 300, and a cartridge is coupled to the inlet 306.

Although, the imaging device 300 is shown to have a housing with one inlet for a cartridge and the air purging unit with one fluid-flow channel, in an example implementation, the imaging device may include a plurality of inlets for multiple cartridges and the air purging unit may accordingly include a plurality of fluid-flow channels. As also mentioned earlier, the number of fluid-flow channels in the air purging unit may be equal to the number of inlets for cartridges that are in the housing of the imaging device.

Figure 4A:
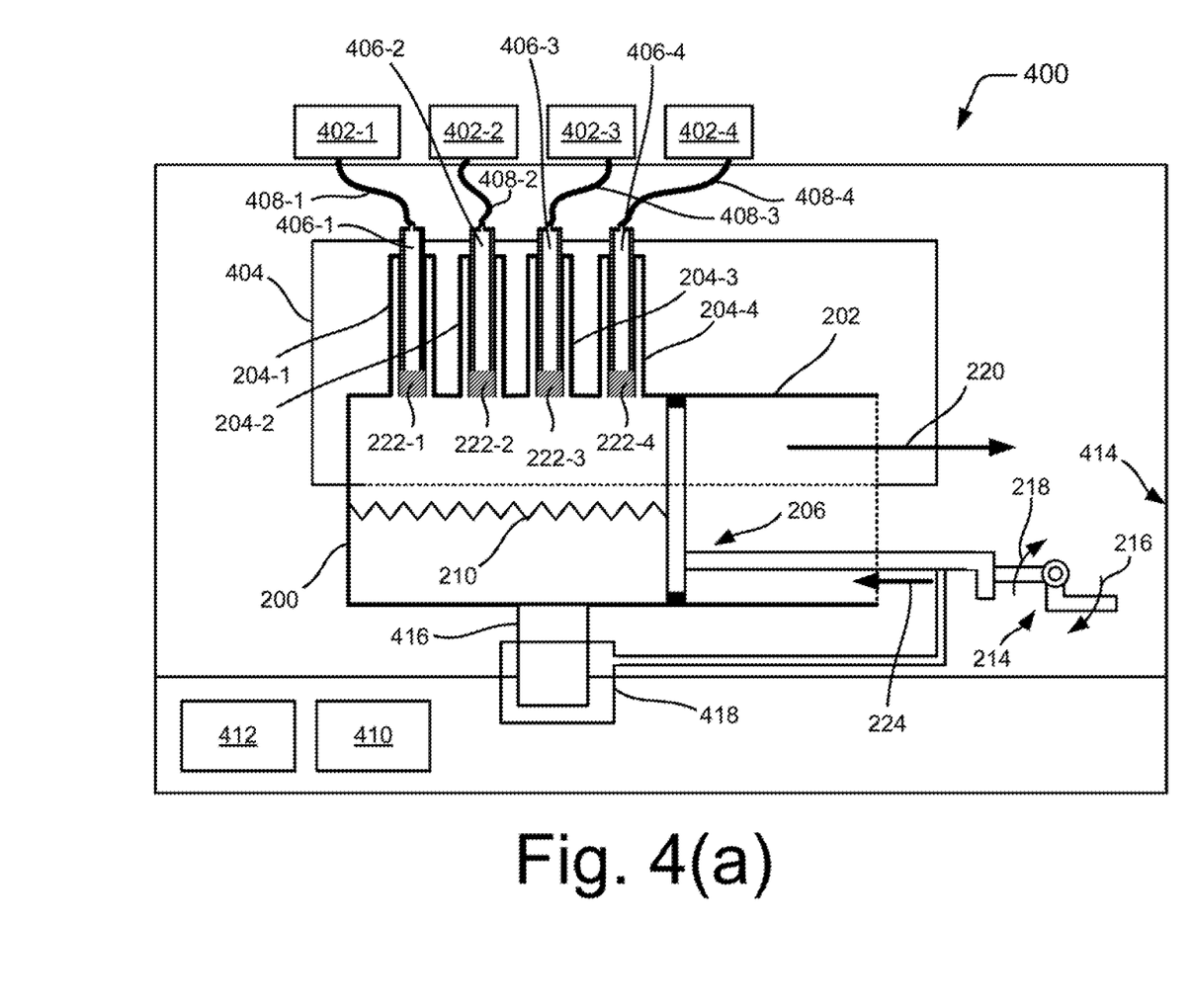
FIG. 4(a) illustrates a schematic view of an imaging device with an air purging unit, according to another example.

FIG. 4(a) illustrates a schematic view of an imaging device 400 with the air purging unit 200, according to another example. The imaging device 400 may be a printer, a photocopier, a plotter, or the like. The imaging device 400, apart from other components, includes four fluid storage chambers 402-1 to 402-4, a housing 404 with four inlets 406-1 to 406-4, and four fluid delivery tubes 408-1 to 408-4. One fluid delivery tube fluidically couples one fluid storage chamber to one inlet. The fluid storage chambers, collectively referred to as 402, respectively store printing fluids of cyan, magenta, yellow, and black color. Each of the fluid storage chambers 402 supplies a printing fluid stored therein. Each of the inlets, collectively referred to as 406, is to receive the printing fluid from a respectively connected fluid storage chamber and the fluid delivery tube, and delivers the printing fluid to a cartridge (not shown in FIG. 4(a)) couplable to the respective inlet. The housing 404 may move over a medium for the purpose of printing on the medium or may move over a surface having a build material for the purpose of forming a 3D object. The other components (not shown) of the imaging device 400 may include, but are not limited to, a media source, an input/output interface, an output tray, and other electronic and electrical components.

Further, the air purging unit 200 is coupled to the housing 404. For coupling the air purging unit 200 to the housing 404, the fluid-flow channels 204 of the air purging unit 200 are coupled to the inlets 406, as shown in FIG. 4(a). The components of the air purging unit 200 are illustrated and described earlier through the description of FIG. 2. The locking unit 214 is pivotally coupled to a housing of the air purging unit 200. The locking unit 214 may be coupled to the housing of the air purging unit 200 through a spring (not shown). The spring enables bringing back the locking unit 214 in its position as shown in FIG. 4(a).

In an example implementation, the imaging device 400 includes a purge detection sensor 410. The purge detection sensor 410 is to detect removal of air from the fluid delivery tube(s), collectively referred to as 408, based on release of the piston element 206 from the barrel 202. In an example implementation, the purge detection sensor 410 may be an optical or an electrical sensor. The release of the piston element 206 from the barrel 202 may trigger the purge detection sensor 410 to detect removal of air from the fluid delivery tube(s).

Further, in an example implementation, the imaging device 400 includes a control unit 412. With the locking unit 214 being a mechanical lock, the control unit 412 is to move the housing 404 to an end inside the imaging device 400, in response to switching ON the imaging device 400 upon filling the printing fluid in the fluid storage chambers 402.

The movement of the housing 404 to the end is to unlock the mechanical lock. In an example, when the imaging device 400 is switched ON after filling the printing fluid in the fluid storage chambers 402, the control unit 412 may provide an electrical signal to the housing 404 to move the housing 404 in a direction, indicated by the arrow 220, towards one end 414 of the imaging device 400. As the locking unit 214 hits the end 414, the locking unit 214 pivots and moves in directions indicated by arrows 216 and 218. This movement of the locking unit 214 initially moves the piston element 206 in the direction indicated by the arrow 224 to release the piston element 206 and depress the spring element 210. The release of the piston element 206 unbiases the spring element 210 to further push the piston element 206 in the direction indicated by the arrow 220 out from the barrel 202 and break the air-tight seal inside the barrel 202. As a result, a suction action is created which enables removal of air from the fluid delivery tubes 408 through the inlets 406. The self-sealing porous plugs 222 in the fluid-flow channels 204 may self-seal during the purging of air from the fluid delivery tubes 408, in a manner as described earlier in the description with respect to FIG. 2.

As described earlier, the purge detection sensor 410 detects removal of air from the fluid delivery tubes 408 upon release of the piston element 206 from the barrel 202 after purging of air. In an example implementation, the control unit 412 is coupled to the purge detection sensor 410 to generate a notification indicative of removal of air from the fluid delivery tubes 408, based on detection of removal of air by the purge detection sensor 410. The notification may provide an indication of completion of air purging from fluid delivery tubes 408 to a user of the imaging device 400. The user may accordingly proceed to remove the air purging unit 200 from the imaging device 400. The notification may, for example, be a visual notification or an audio notification, or a combination thereof.

Figure 4B:
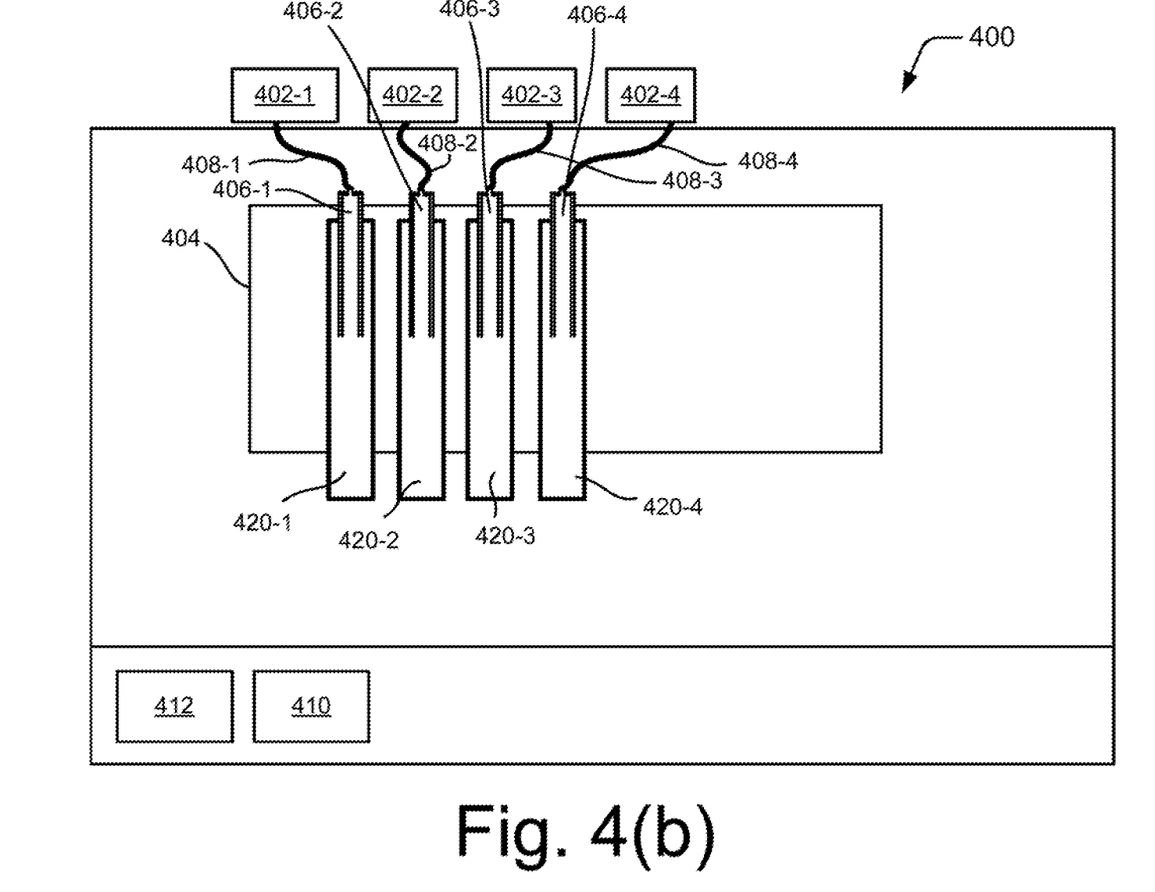
FIG. 4(b) illustrates a schematic view of the imaging device without the air purging unit and with cartridges installed, according to another example.

Upon, removing the air purging unit 200, the user may install cartridges in the housing 404, FIG. 4(b) illustrates a schematic view of the imaging device 400 without the air purging unit 200 and with cartridges 420-1 to 420-4 installed, according to another example. The cartridges, collectively referred to as 420, are coupled to the inlets 406. One cartridge is coupled to one inlet, as shown. Each of the cartridges 420 has a printing fluid reservoir that may hold the printing fluid and supply the printing fluid to a printhead (not shown) having nozzles to dispense the printing fluid from the printing fluid reservoir for printing. In an example implementation, a cartridge may be integrated with a printhead. In another example implementation, a printhead may be external to a cartridge and coupled to the housing 404. Upon coupling the cartridge to the inlet, the cartridge may also couple to the printhead.

In an example implementation, the imaging device 400 further includes a latch 416 coupled to the air purging unit 200. The latch 416 is to retain the air purging unit 200 in its position of coupling with the housing 404. The latch 416 is releasable to remove the air purging unit 200 from the imaging device 400. The latch 416 may be a mechanical latch operable by a user of the imaging device 400 to release the latch and remove the air purging unit 200 from the imaging device 400. Further, in an example implementation, the imaging device 400 includes a flange element 418 to block access of the latch 416. The flange element 418 is movable in response to the release of the piston element 206 from the barrel 202 to enable access of the latch 416 to remove the air purging unit 200 from the imaging device 400. In an example, the flange element 418 may be a plate coupled to the piston element 206, as shown in FIG. 4(a). When the piston element 206 is released, the flange element 418 may move together the piston element 206 in the direction indicated by the arrow 220, thereby unblocking the access to the latch 416. The user may accordingly operate the latch 416 to remove the air purging unit 200 from the imaging device 400.

In an example implementation, the latch 416 may be an electromechanical latch, for example, a solenoid-based lock. The control unit 412 may release the electromechanical latch. In an example, when the purge detection sensor 410 detects removal of air from the fluid delivery tubes, the control unit 412 may provide an electrical signal to the electromechanical latch to release the electromechanical latch. The user may then remove the air purging unit 200 from the imaging device 400 and accordingly install the cartridges 420 in the housing 404.

In an example implementation, the locking unit 214 may be a mechanical lock operable by a user of the imaging device 400. The mechanical lock may be accessible to the user through a window in the housing of the imaging device 400. Upon filling up the printing fluid in the fluid storage chambers, the user may operate the mechanical lock to unlock the mechanical lock and release the piston element 206, break the air-tight seal, and unbias the spring element 210 to remove air from the fluid delivery tubes 408.

Further, in an example implementation, the locking unit 214 may be an electromechanical lock. The control unit 412 may release the electromechanical lock. In an example, when the imaging device 400 is switched ON after filling the printing fluid in the fluid storage chambers 402, the control unit 412 may provide an electrical signal to the electromechanical lock to release the electromechanical lock, which thereby releases the piston element 206, breaks the air-tight seal, and unbiases the spring element 210 to remove air from the fluid delivery tubes 408.

The control unit 412 can be implemented through a combination of any suitable hardware and computer-readable instructions. The control unit 412 may be implemented in a number of different ways to perform various functions including, but not limited to, operating the housing 404, operating the locking unit 214, and generating the notification as described herein. For example, the computer-readable instructions for the control unit 412 may be processor-executable instructions stored in a non-transitory computer-readable storage medium, and the hardware for the control unit 412 may include a processing resource (e.g., processor(s)), to execute such instructions. In the present examples, the non-transitory computer-readable storage medium stores instructions which, when executed by the processing resource, implements the control unit 412. The imaging device may include the non-transitory computer-readable storage medium storing the instructions and the processing resource (not shown) to execute the instructions. In an example, the non-transitory computer-readable storage medium storing the instructions may be external, but accessible to the processing resource of the imaging device. In another example, the control unit 412 may be implemented by electronic circuitry.

The processing resource of the imaging device may be implemented as microprocessors, microcomputers, microcontrollers, digital signal processors, central processing units, state machines, logic circuitries, and/or any devices that manipulate signals based on operational instructions. Among other capabilities, the processing resource may fetch and execute computer-readable instructions stored in a non-transitory computer-readable storage medium coupled to the processing resource of the imaging device. The non-transitory computer-readable storage medium may include, for example, a volatile memory (e.g., a random-access memory), and/or a non-volatile memory (e.g., an erasable programmable read-only memory, a flash memory, a non-volatile random-access memory, memristor, etc.).

Figure 5:
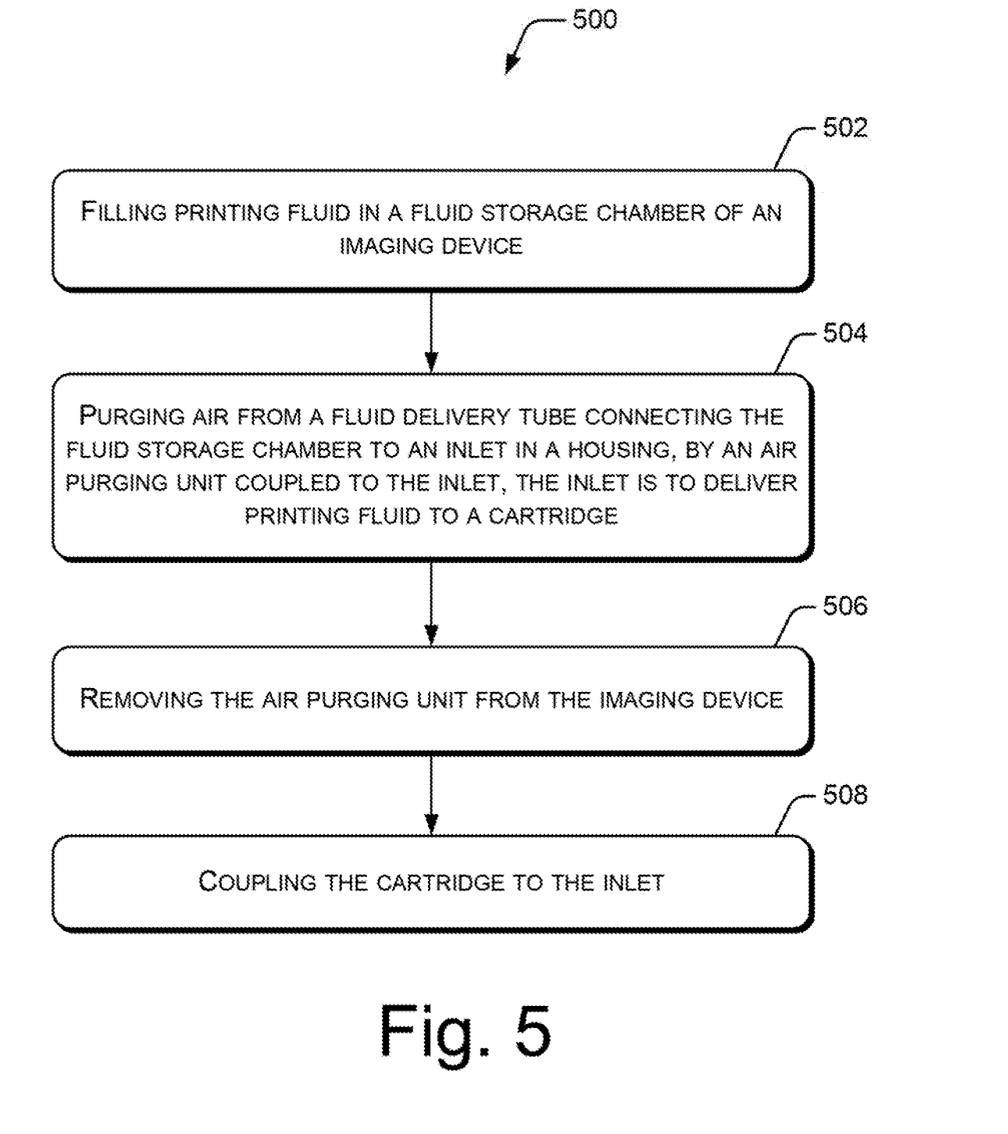
FIG. 5 illustrates a method of purging air in an imaging device, according to an example.

FIG. 5 illustrates a method 500 of purging air in an imaging device, according to an example. It may be noted that for execution of the method 500 the imaging device is pre-fitted with an air purging unit of the present subject matter, no cartridge is installed in the housing of the imaging device, and no printing fluid is filled in the fluid storage chamber of the imaging device. Although the method 500 is described in context of the aforementioned imaging device 300 fitted with the air purging unit 100, the method 500 may be performed in other suitable devices or systems fitted with an air purging unit of the present subject matter.

Referring to FIG. 5, at block 502 of the method 500, a printing fluid is filled in the fluid storage chamber 302 of the imaging device 300. Printing fluid may be filled manually by a user of the imaging device 300. At block 504, air is purged from the fluid delivery tube 308 connecting the fluid storage chamber 302 to the inlet 306 in the housing 304, by the air purging unit 100 coupled to the inlet 306. The inlet 306 is to deliver the printing fluid to a cartridge, when the cartridge is coupled to the inlet 306. For purging the air from the fluid delivery tube 308, the locking unit 120 of the air purging unit 100 is unlocked. Unlocking of the locking unit 120 releases the piston element 110 and unbiases the spring element 116 to remove air from the fluid delivery tube 308 through the inlet 306. Further, for unlocking the locking unit 120, the imaging device 300 is switched ON upon filling the printing fluid in the fluid storage chamber 302, and the housing 304 is moved to an end inside the imaging device 300 to unlock the locking unit 120 by an end wall of the imaging device 300, as described earlier in the description.

After purging the air, the air purging unit 100 is removed from the imaging device 300, at block 506. The air purging unit 100 may be removed manually by the user. Prior to removing the air purging unit 100, it is determined whether air is purged successfully from the fluid delivery tube 308. Successful purging of air from the fluid delivery tube 308 may be determined by a purge detection sensor, as described earlier, based on release of the piston element 110. The air purging unit 100 is then removed from the imaging device 300 in response to determining that air is purged successfully. Further, at block 508, a cartridge is coupled to the inlet 306.

Figure 6:
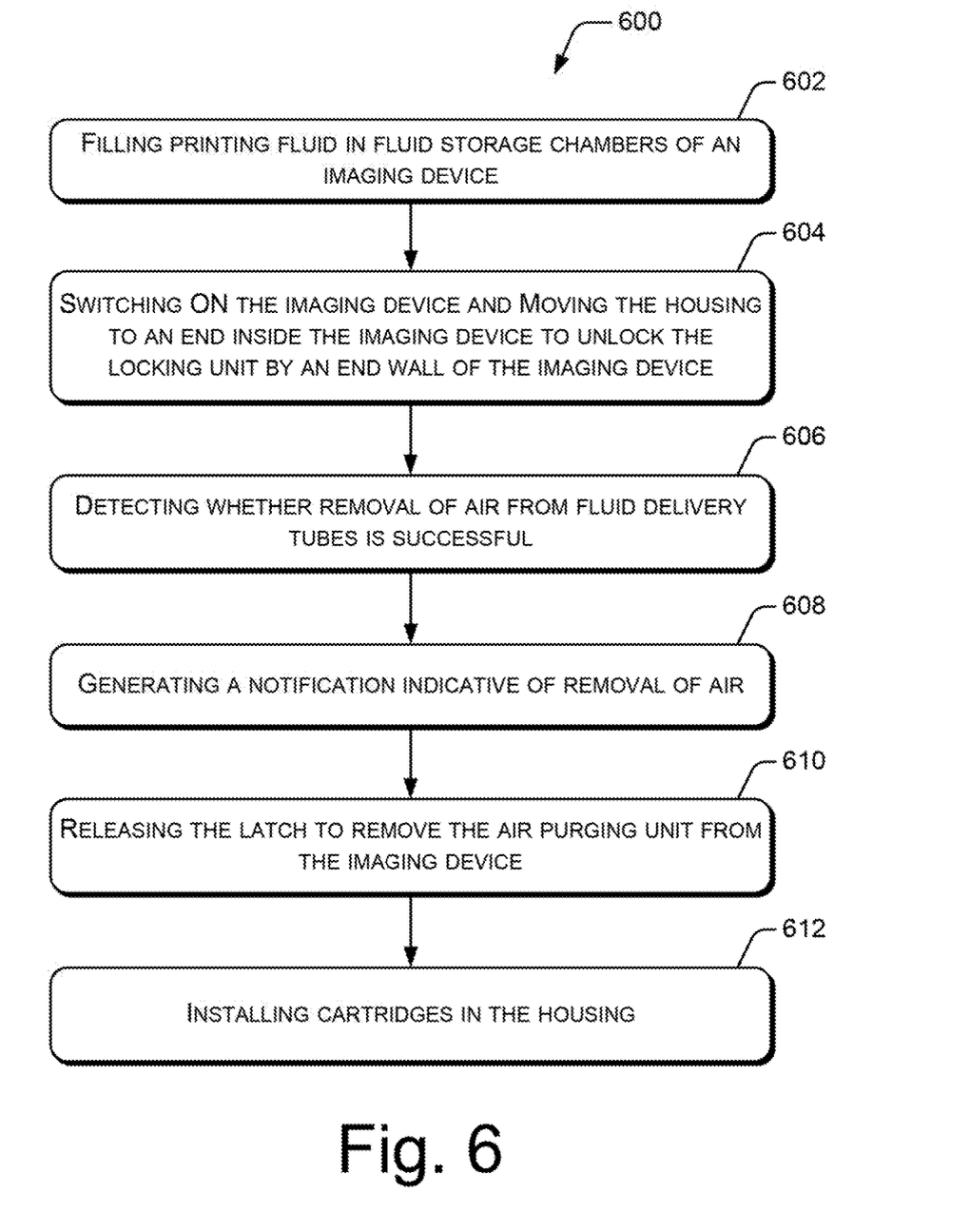
FIG. 6 illustrates a method of purging air in an imaging device, according to an example.

FIG. 6 illustrates a method 600 of purging air in an imaging device, according to an example. Although the method 600 is described in context of the aforementioned imaging device 400 fitted with the air purging unit 200, the method 600 may be performed in other suitable devices or systems fitted with an air purging unit of the present subject matter.

Referring to FIG. 6, at block 602, of the method 600, a printing fluid is filled in the fluid storage chambers 402 of the imaging device 400. Printing fluid may be filled manually by a user. The fluid storage chambers 402 may have markings to indicate the level of printing fluid filled therein. The user may fill printing fluid until the fluid storage chambers are full.

At block 604, the imaging device 400 is switched ON and the housing 404 is moved to an end inside the imaging device 400 to unlock the locking unit 214 by an end wall of the imaging device 400. Unlocking of the locking unit 214, moves the piston element 206 inward into the barrel 202 to release the piston element 206 and depress the spring element 210. The release of the piston element 206 unbiases the spring element 210 to push the piston element 206 outward from the barrel 202 and break the air-tight seal in the barrel 202. The movement of the piston element 206 out from barrel 202 removes air from the fluid delivery tubes 408 through the inlets 406. It may be noted that air from the fluid delivery tubes 408 may be purged until the self-sealing porous plugs 222 are self-sealed by the printing fluid received in the inlets 406.

At block 606, it is detected whether the removal of air from the fluid delivery tubes 408 is successful. The successful removal of air is detected by the purge detection sensor 410 based on release of the piston element 206 from the barrel 202. Upon detecting that the air is purged successfully, a notification indicative of removal of air is generated, at block 608. The notification may be generated by the control unit 412. The notification may be in the form of a visual or an audio notification. Such a notification helps the user to confirm successful purging of air from the fluid delivery tubes 408.

After this, at block 610, the latch 416 is released to remove the air purging unit 200 from the imaging device 400. The latch 416 is operated by the user. Access to the latch 416 may be blocked by the flange element 418 prior to releasing the locking unit 214. The flange element 418 moves in response to the release of the piston element 206 from the barrel 202 to allow access to the latch 416 to remove the air purging unit 200. After removing the air purging unit 200, cartridges 420 are installed in the housing 404, at block 612.

Although examples for the present disclosure have been described in language specific to structural features and method, it is to be understood that the appended claims are not limited to the specific features and methods described herein. Rather, the specific features and methods are disclosed and explained as examples of the present disclosure.

We claim:

1. An air purging unit for an imaging device, comprising:
   a barrel;
   a fluid-flow channel, one end of the fluid-flow channel being connected to the barrel and another end of the fluid-flow channel being removably couplable to an inlet of a housing of the imaging device, the inlet being couplable to a fluid delivery tube from a fluid storage chamber to deliver a printing fluid to a cartridge;
   a piston element forming an air-tight seal inside the barrel;
   a spring element, in a biased state, connected between an inner surface of the barrel and the piston element; and
   a locking unit to lock the piston element and retain the spring element in the biased state, wherein the locking unit is unlockable to release the piston element, break the air-tight seal, and unbias the spring element to remove air from the fluid delivery tube through the inlet prior to coupling the cartridge to the inlet.

2. The air purging unit as claimed in claim 1, wherein the locking unit is to move the piston element prior to breaking the air-tight seal.

3. The air purging unit as claimed in claim 1, further comprises a self-sealing porous plug in the fluid-flow channel, wherein the self-sealing porous plug is to interface with the inlet and is to:
   allow air to pass through; and
   self-seal in response to receiving the printing fluid from the inlet.

4. An imaging device comprising:
a fluid storage chamber;
a housing with an inlet to deliver a printing fluid to a cartridge couplable to the inlet;
a fluid delivery tube fluidically coupling the fluid storage chamber to the inlet; and
an air purging unit detachably coupled to the inlet to remove air from the fluid delivery tube prior to coupling the cartridge to the inlet.

5. The imaging device as claimed in claim 4, wherein the air purging unit comprises:
a barrel;
a fluid-flow channel, one end of the fluid-flow channel being connected to the barrel and another end of the fluid-flow channel being connected to the inlet;
a piston element forming an air-tight seal inside the barrel;
a spring element, in a biased state, connected between an inner surface of the barrel and the piston element; and
a locking unit to lock the piston element and retain the spring element in the biased state, wherein the locking unit is unlockable to release the piston element, break the air-tight seal, and unbias the spring element to remove air from the fluid delivery tube through the inlet.

6. The imaging device as claimed in claim 5, wherein the locking unit is to move the piston element prior to breaking the air-tight seal.

7. The imaging device as claimed in claim 5, wherein the locking unit comprises a mechanical lock.

8. The imaging device as claimed in claim 7, further comprising a control unit to move the housing to an end inside the imaging device in response to switching ON the imaging device upon filling the printing fluid in the fluid storage chamber, wherein movement of the housing to the end is to unlock the mechanical lock.

9. The imaging device as claimed in claim 5, further comprises a self-sealing porous plug in the fluid-flow channel, wherein the self-sealing porous plug is to interface with the inlet and is to:
allow air to pass through; and
self-seal in response to receiving the printing fluid from the inlet.

10. The imaging device as claimed in claim 5, further comprising:
a purge detection sensor to detect removal of air from the fluid delivery tube based on release of the piston element from the barrel; and
a control unit coupled to the purge detection sensor to generate a notification indicative of removal of air from the fluid delivery tube, based on detection of removal of air by the purge detection sensor.

11. The imaging device as claimed in claim 5, further comprising:
a latch releasable to remove the air purging unit from the imaging device; and
a flange element to block access to the latch, the flange element being movable in response to release of the piston element from the barrel to enable access to the latch to remove the air purging unit.

12. A method comprising:
filling a printing fluid in a fluid storage chamber of an imaging device;
purging air from a fluid delivery tube connecting the fluid storage chamber to an inlet in a housing of the imaging device, by an air purging unit coupled to the inlet, the inlet is to deliver the printing fluid to a cartridge;
removing the air purging unit from the imaging device; and
coupling the cartridge to the inlet.

13. The method as claimed in claim 12, wherein purging the air from the fluid delivery tube comprises:
unlocking a locking unit that holds a piston element inside a barrel of the air purging unit, the barrel being connected to the inlet through a fluid-flow channel, and the piston element being connected to a spring element in a biased state,
wherein unlocking of the locking unit is to release the piston element and unbias the spring element to remove air from the fluid delivery tube through the inlet.

14. The method as claimed in claim 13, wherein unlocking of the locking unit comprises:
switching ON the imaging device upon filling the printing fluid in the fluid storage chamber; and
moving the housing to an end inside the imaging device to unlock the locking unit by an end wall of the imaging device.

15. The method as claimed in claim 13, further comprising:
determining whether air is purged from the fluid delivery tube based on release of the piston element, wherein removing the air purging unit is in response to determining that air is purged.

* * * * *